Feb. 17, 1959 H. G. COLMER, JR., ET AL 2,873,948
WINCH
Filed July 31, 1956 2 Sheets-Sheet 1

INVENTORS
Henry G. Colmer, Jr. and
Francis M. Snow
BY Mason, Fenwick & Lawrence
ATTORNEYS Feb. 17, 1959  H. G. COLMER, JR., ET AL  2,873,948
WINCH
Filed July 31, 1956  2 Sheets-Sheet 2

INVENTORS
Henry G. Colmer, Jr. and
Francis M. Snow
BY
Mason, Fenwick & Lawrence
ATTORNEYS

United States Patent Office 2,873,948
Patented Feb. 17, 1959

2,873,948

WINCH

Henry G. Colmer, Jr., and Francis M. Snow, Mobile, Ala.

Application July 31, 1956, Serial No. 601,317

4 Claims. (Cl. 254—187)

This invention relates to winches and particularly winches adapted for use with heavy loads, such as are encountered in marine use for example.

There are several well-recognized difficulties pertaining to the design, manufacture and use of heavy duty winches. One of these has been excessive gear tooth wear. Heavy loads cause rapid wear of conventional gears; wear causes lost motion between gears; and, lost motion usually results in broken gear teeth. Another difficulty has been the production of a heavy duty winch wherein great power multiplication is possible, yet an instant shifting to rapid windup on the drum can be made. Where such power and shifting have been achieved in the past, it has usually been through the use of elaborate and expensive transmissions.

The object of the present invention is to provide a heavy duty winch having great pulling power and simple and efficient means for quickly shifting to permit rapid windup of the drum.

Another object is the provision of such a winch wherein improved gear means are provided to greatly lengthen the life of the driving mechanism.

A further object of the invention is to provide a winch which will be extremely efficient in operation, yet very simple in design and structure.

Yet another object is the provision of a winch of this kind wherein all of the reeling, unreeling, shifting, etc., is accomplished by operation of a single member.

Other objects of the invention will appear from the following description of one practical embodiment thereof, when taken in conjunction with the drawings which accompany, and form part of, this specification.

Figure 1:
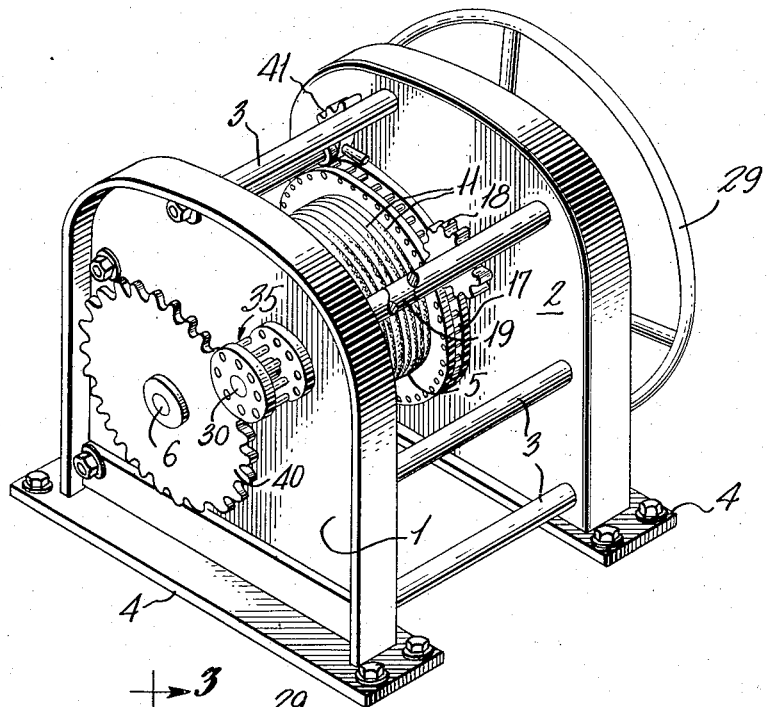
Figure 1 is a perspective view of a heavy duty winch embodying the principles of the present invention.
Figure 2:
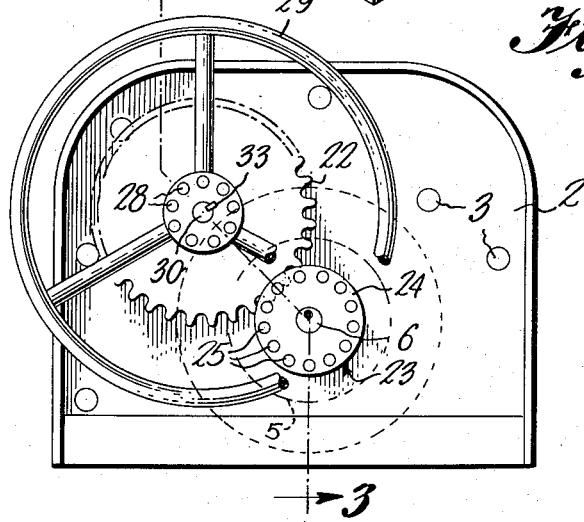
Figure 2 is a side view of the winch, viewed from the operator's side.

In general, the invention concerns a heavy duty winch having a cable drum rotated by means of a hand wheel, the gear train providing the drive from the hand wheel to the drum being shiftable to provide a slow but powerful or a rapid winding movement by an in and out movement of the hand wheel and its shaft.

Referring to the drawings in detail, there is shown a winch having a frame consisting of spaced side plates 1 and 2, held in spaced relation by the spacer rods 3. Base, or deck, plates 4 are fixed to the bottoms of the side plates and provide means by which the winch can be mounted upon a deck or other supporting platform.

A cable drum 5 is mounted between the side plates on a shaft 6, journaled in the side plates as at 7 and 8 and extending beyond the plates on each side. The drum is provided with bushings 9 and 10 at its ends for mounting on the shaft 6 so that the drum will be freely rotatable on the shaft. The cable 11 has one end extended through a hole 12 in the drum, and a cable clamp 13 on the inside of the drum holds the cable fixed to the drum.

A side plate 14 of the drum is used with an annular plate 15 and a plurality of pins 16 to form a gear 17 by means of which the drum can be driven. The plate 15 is positioned about the drum inwardly of the end plate 14, and the pins bridge the space between the plates 14 and 15, spaced apart a distance equal to the distance between the teeth of the gear which are to coact with them.

Gear 17 is driven by a double gear 18 mounted on a hollow shaft 19, mounted in bearings 20 and 21 in the plates 1 and 2. Shaft 19 carries a large gear 22, at one end, which is splined to shaft 19 and in mesh with a pin gear 23 mounted upon the shaft 6. Gear 23 is made up of a pair of spaced plates 24 fixed to shaft 6 and a plurality of pins 25 bridging the space between the plates.

Gear 22 has a hub 26 provided with a circular series of openings 27 extending parallel to the shaft 19. These openings are arranged to receive an equal number of pins 28 carried by a hand wheel 29 fixed to a shaft 30, rotatably mounted within the hollow shaft 19. Shaft 19 is bushed at its ends, as at 31 and 32 for free rotation on shaft 30. The handwheel is fixed to the shaft by a spline 33 and a set screw 34. It will be obvious, that when the handwheel is pushed in, as shown in full lines in Figure 3, pins 28 will be engaged in openings 27 in the gear 22, so that when the handwheel is rotated gear 22 and shaft 19 will be rotated also to drive the drum. This will provide a rapid rotation of the drum, the speed depending upon the ratio between the gears 17 and 18.

Figure 3:
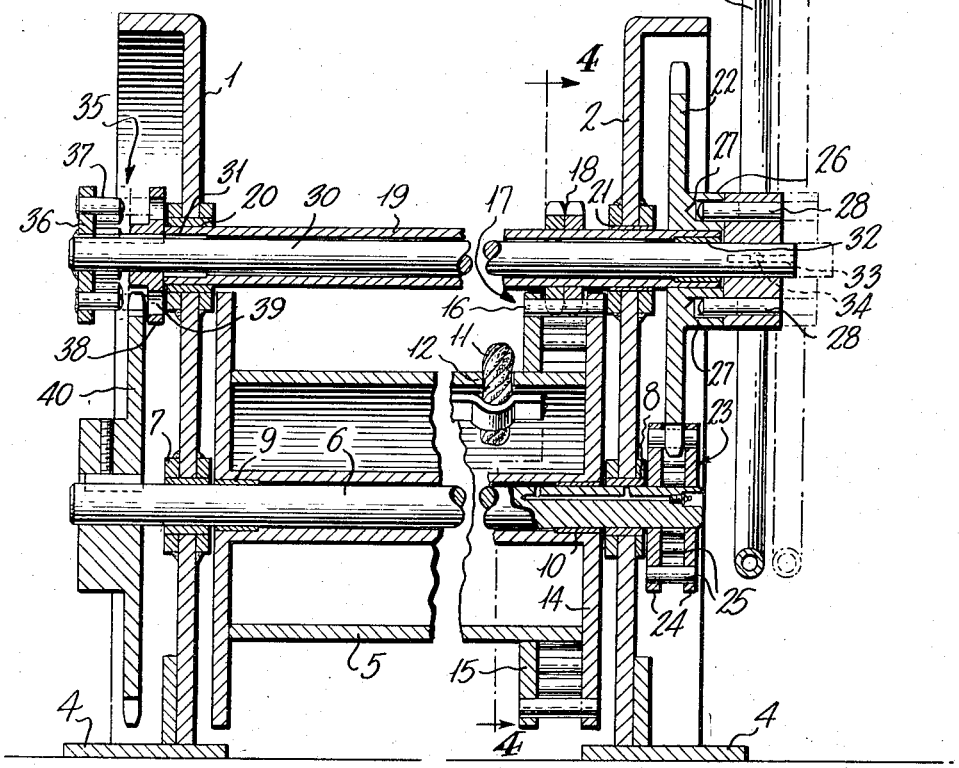
Figure 3 is a vertical section, taken on the line 3—3 of Figure 2 with central portions broken away; and, Figure 4 is a vertical section taken on the line 4—4 of Figure 3.
Figure 4:
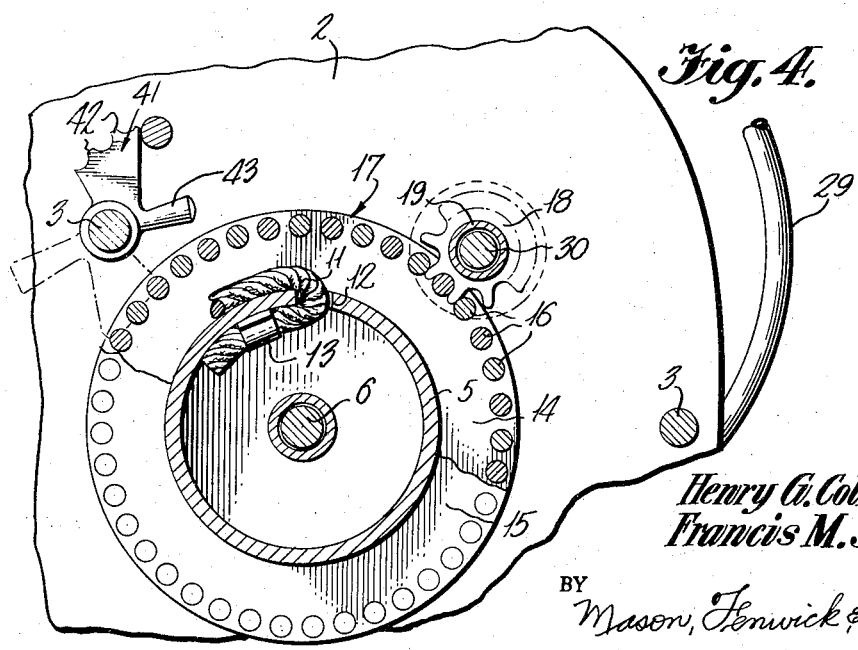

When the handwheel is pulled outwardly to the position shown in dotted lines in Figure 3, pins 28 are withdrawn from the holes in the hub of gear 22 and rotation of the handwheel will no longer directly cause rotation of the gear 22. When handwheel 29 is pulled outwardly, shaft 30 moves axially with it causing engagement of the clutch 35 and a shifting of the drive train.

Clutch 35 is composed of two members; a clutch plate 36 welded to shaft 30 and carrying a circular series of projecting pins 37, and a clutch plate 38, splined to the shaft for sliding movement thereon, and having a series of openings 39 to receive the pins 37. Both clutch members rotate with shaft 30 whenever the shaft is rotated, whether the members are engaged or not. When the members are engaged, they form a pin gear similar to gear 23. The clutch gear engages a gear 40 mounted on the end of shaft 6 opposite gear 23. It will be clear from Figure 3, that clutch plate 38 is held against endwise movement between the gear 40 and the bearing 20 on the side plate 1, and that shaft 30 slides throught it. When the handwheel is pushed in, the clutch plate 36 and its pins 37 will be withdrawn and the pins will no longer engage the teeth of gear 40. When the handwheel is pulled out, the pins 37 again engage the teeth of gear 40 and are seated in the openings in clutch plate 38 so that they will be supported at both ends to withstand driving strains without canting or breaking.

When the handwheel is pulled outwardly, its rotation will be transmitted through shaft 30 to clutch 35, to gear 40, and then through shaft 6 to gears 23 and 22, and shaft 19 and double gear 18 to the cable drum. Thus, a great multiplication of power is obtainable.

In order to hold the load at any time without holding on to the handwheel, there is a dog 41 pivotally mounted on one of the spacers 3. The dog is provided with one or more teeth 42 to engage the pins 16 of the gear 17.

A handle 43 is fixed to the dog so that it can be swung to and from operative position.

It is believed that enough of the operation has been explained during the description of the structure to make the entire operation clear.

It will be noted that an instantaneous shift from a fast wind to a powerful drive can be accomplished by a simple, natural push-pull operation of the handwheel. The operator will have his hands on the wheel during operation of the winch, and he need not move them from the wheel to change the winding power or speed.

While in the above one practical embodiment of the invention has been disclosed it will be understood that the details of structure described and shown are merely by way of illustration and the invention may take other forms within the scope of the appended claims.

What is claimed is:

1. A heavy duty winch comprising, a frame, a first shaft journalled in the frame, a cable drum rotatably mounted on the shaft, a second shaft which is hollow rotatably mounted in the frame, a third shaft rotatably and slidably mounted within the second shaft and having its ends extending beyond the ends of the second shaft, gears on the second shaft and drum in driving engagement, gears on the first and second shafts in driving engagement, a gear on the first shaft and a pin gear on the projecting end of the third shaft in driving engagement, the pin gear consisting of a pair of plates one of which is fixed to the third shaft and the other splined to the third shaft for sliding movement thereon, one of the plates carrying a plurality of pins annularly spaced for engagement between the teeth of the gear with which the pin gear is in driving connection and the other plate an equal plurality of openings to receive the pins, and engageable companion driving means on the second and third shafts, whereby axial movement of the third shaft in one direction will cause engagement of the companion driving means and separation of the pin gear plates and movement in the opposite direction will disengage the companion driving means and bring together the plates of the pin gear to cause the pins of the one plate to enter the holes of the other.

2. In a heavy duty winch as claimed in claim 1, a dog to engage the drum to hold it against rotation.

3. In a heavy duty winch of the type having a frame, a rotatably mounted cable drum on the frame with a gear train drivingly connected thereto, the improvement which consists in a gear in said train being a pin gear mounted upon an axially movable shaft, the pin gear comprising a pair of plates one of which is fixed to the shaft and the other plate being splined to the shaft for sliding movement thereon, the fixed plate having a plurality of pins extending therefrom annular spaced for engagement between the teeth of the gear of the train with which the pin gear is in driving connection and the other plate having an equal plurality of openings to receive the pins, whereby upon axial movement of said shaft the plates of the pin gear will be separated and the drive of said gear train interrupted.

4. In a heavy duty winch as claimed in claim 3, said plate having the holes being splined to the shaft and mounted between the frame and the gear with which the pin gear is in driving connection, whereby said plate having the holes will be held against movement when the shaft is moved axially.

References Cited in the file of this patent

UNITED STATES PATENTS

| | | |
|---|---|---|
| 1,433,289 | McKenna | Oct. 24, 1922 |
| 2,553,031 | Benson et al. | May 15, 1951 |